(12) United States Patent
Miller et al.

(10) Patent No.: US 7,878,809 B2
(45) Date of Patent: Feb. 1, 2011

(54) HEADWALL FOR TRAINING PATIENT CARE PROVIDERS

(76) Inventors: Rebecca Shana Miller, 750 Garcia Ave., Pittsburg, CA (US) 94565; John M. Sharer, 39 Hunter's La., Batesville, IN (US) 47006

( * ) Notice: Subject to any disclaimer, the term of this patent is extended or adjusted under 35 U.S.C. 154(b) by 1135 days.

(21) Appl. No.: 11/430,660

(22) Filed: Apr. 25, 2006

(65) Prior Publication Data
US 2007/0259321 A1    Nov. 8, 2007

(51) Int. Cl.
*G09B 19/00* (2006.01)
(52) U.S. Cl. ............... 434/219; 52/29; 52/38; 52/36.4
(58) Field of Classification Search ............ 52/29, 52/36.1, 36.4, 38, 36.5; 434/265–272, 219; 5/600, 658; 340/652; 601/152
See application file for complete search history.

(56) References Cited

U.S. PATENT DOCUMENTS

| | | | |
|---|---|---|---|
| 3,462,892 A | 8/1969 | Meyer | |
| 3,520,071 A | 7/1970 | Abrahamson et al. | |
| 3,860,000 A * | 1/1975 | Wootten et al. | 604/28 |
| 3,955,574 A * | 5/1976 | Rubinstein | 604/120 |
| 4,006,538 A | 2/1977 | Valentine | |
| 4,338,485 A | 7/1982 | Fullenkamp et al. | |
| 4,411,629 A | 10/1983 | Voights | |
| 4,545,766 A | 10/1985 | Schoessow | |
| 4,753,055 A | 6/1988 | Durham, Jr. | |
| 5,314,339 A | 5/1994 | Aponte | |
| 5,509,810 A | 4/1996 | Schertz et al. | |
| 5,966,760 A * | 10/1999 | Gallant et al. | 5/658 |
| 6,773,263 B2 | 8/2004 | Nicholls et al. | |
| 6,897,780 B2 | 5/2005 | Ulrich et al. | |
| 6,918,771 B2 | 7/2005 | Arington et al. | |
| 2004/0224294 A1 | 11/2004 | Heininger et al. | |
| 2005/0102912 A1* | 5/2005 | Gallant et al. | 52/36.4 |
| 2006/0290525 A1* | 12/2006 | Andersen et al. | 340/632 |

* cited by examiner

*Primary Examiner*—Xuan M Thai
*Assistant Examiner*—Timothy Musselman
(74) *Attorney, Agent, or Firm*—Adams Law Office; Sharon Adams

(57) ABSTRACT

The training headwall is a self-contained unit that delivers air and vacuum to medical gas outlets. Each training headwall contains a minimum of two motors, one a compressor to provide simulated gas flow, and the other a vacuum pump to provide a vacuum run off of electricity supplied from a standard electrical outlet. Because the training headwalls are not used on actual patients there is no need to deliver actual medical gases. Instead, the compressor pumps air to medical gas outlets that are labeled as desired, and may be attached to the appropriate secondary medical equipment, while the vacuum delivers a vacuum to the appropriately labeled gas outlet. Students may use the training headwall to practice patient care procedures.

17 Claims, 3 Drawing Sheets

HEADWALL FOR TRAINING PATIENT CARE PROVIDERS

CROSS-REFERENCE TO RELATED APPLICATIONS

Not applicable.

FEDERAL SPONSORSHIP

Not applicable.

BACKGROUND OF THE INVENTION

The present invention relates to headwall units used for training nurses and other persons involved in patient care. Headwall units are typically located in patient care rooms in hospitals, nursing homes, and the like.

A variety of headwalls exist in the prior art, as seen in U.S. Pat. Nos. 4,753,055, 4,338,485, and 3,462,892. Each of the headwalls described in these patents is a fully functioning headwall designed for use with actual patients in a patient care room. A typical headwall is placed near a patient's bed, and contains light, electricity, and medical gas outlets. These medical gas outlets may provide a variety of gases, including oxygen, nitrous oxide, or air, and may also provide a vacuum outlet. Secondary equipment may be attached to the vacuum or gas outlets in the headwall for use in patient care. If a patient needs vacuum or a particular gas the patient care provider simply removes the cover of the appropriate medical gas outlet, and attaches the needed secondary equipment, such as, a vacuum regulator, or a flow meter, to the outlet The gases arrive at each patient's headwall via pipes that are attached to central compressors, and the vacuum arrives at each headwall via pipes that are attached to a central pump. The compressors and pumps are typically located remotely from the patients' beds, frequently in the basement.

When health care providers are being trained in patient care they need to practice manipulating headwalls, medical gas outlets, and secondary medical equipment so that they will be able to respond appropriately when providing care to actual patients. The current invention describes training headwalls that are not used with actual patients, and therefore are not attached to central compressors or pumps. Instead, the training headwalls contain a small vacuum pump and compressor to simulate gas flow through medical gas outlets.

BRIEF SUMMARY OF THE INVENTION

In order to provide flexibility, mobility, and to decrease costs, each training headwall is a self-contained unit that delivers air and vacuum to medical gas outlets. Each training headwall can be designed to meet the specifications of the training facility and may come in a variety of sizes and shapes with a variety of lighting, electrical, and other patient care options. Each training headwall contains a minimum of two relatively small motors, one a compressor to provide simulated gas flow, and the other a pump to provide a vacuum. The motors are run by electricity supplied from a standard electrical cord and outlet. Because the training headwalls are not used on actual patients, there is no need to deliver a vacuum, oxygen, nitrous oxide or other gases to the medical gas outlets. Instead, the motors deliver air or vacuum to medical gas outlets that are labeled as desired.

The vacuum pump is connected to the vacuum outlet in the headwall. The patient care trainee can practice manipulating the medical gas outlets, attaching secondary medical equipment to the outlets, and experience the flow of gas or vacuum through the training headwall.

DETAILED DESCRIPTION OF THE INVENTION

The current art contains many different kinds of headwalls. There are vertical and horizontal headwalls, half-wall, single or multiple section headwalls, recessed, ceiling mounted, or the headwalls that contain cabinets. The present invention may come in any of these combinations or configurations. The training headwalls may also contain a variety of options, either standard or as requested by the training facility. For example, the training headwall may contain vertical equipment tracks, track accessories, nurse call systems, equipotential grounding systems, bed bumpers, monitor support, isolated power, emergency electrical receptacles, normal electrical receptacles, or any other headwall option as requested by the training facility.

Figure 1:
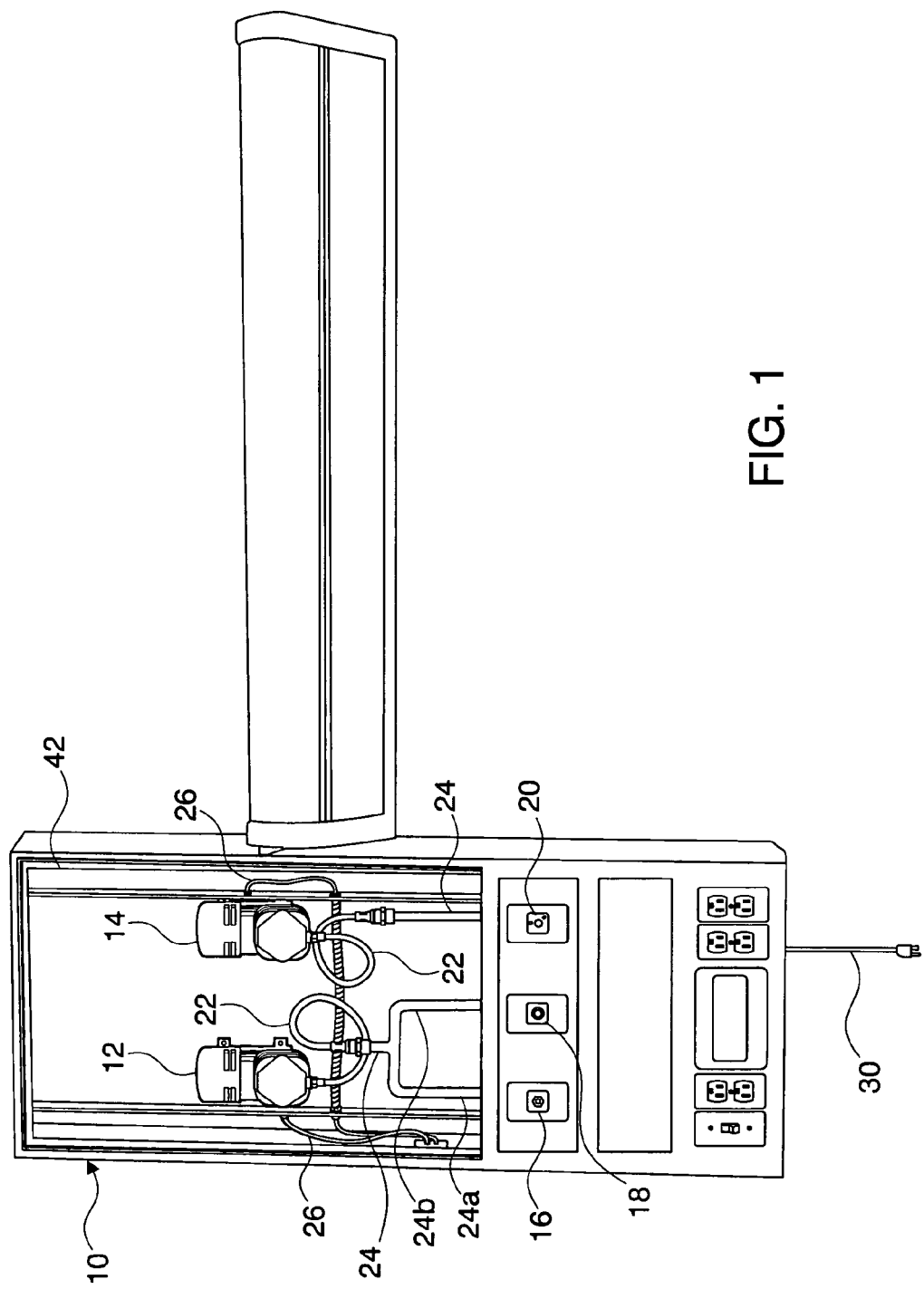
FIG. 1 is a front view of one embodiment of the invention.
Figure 3:
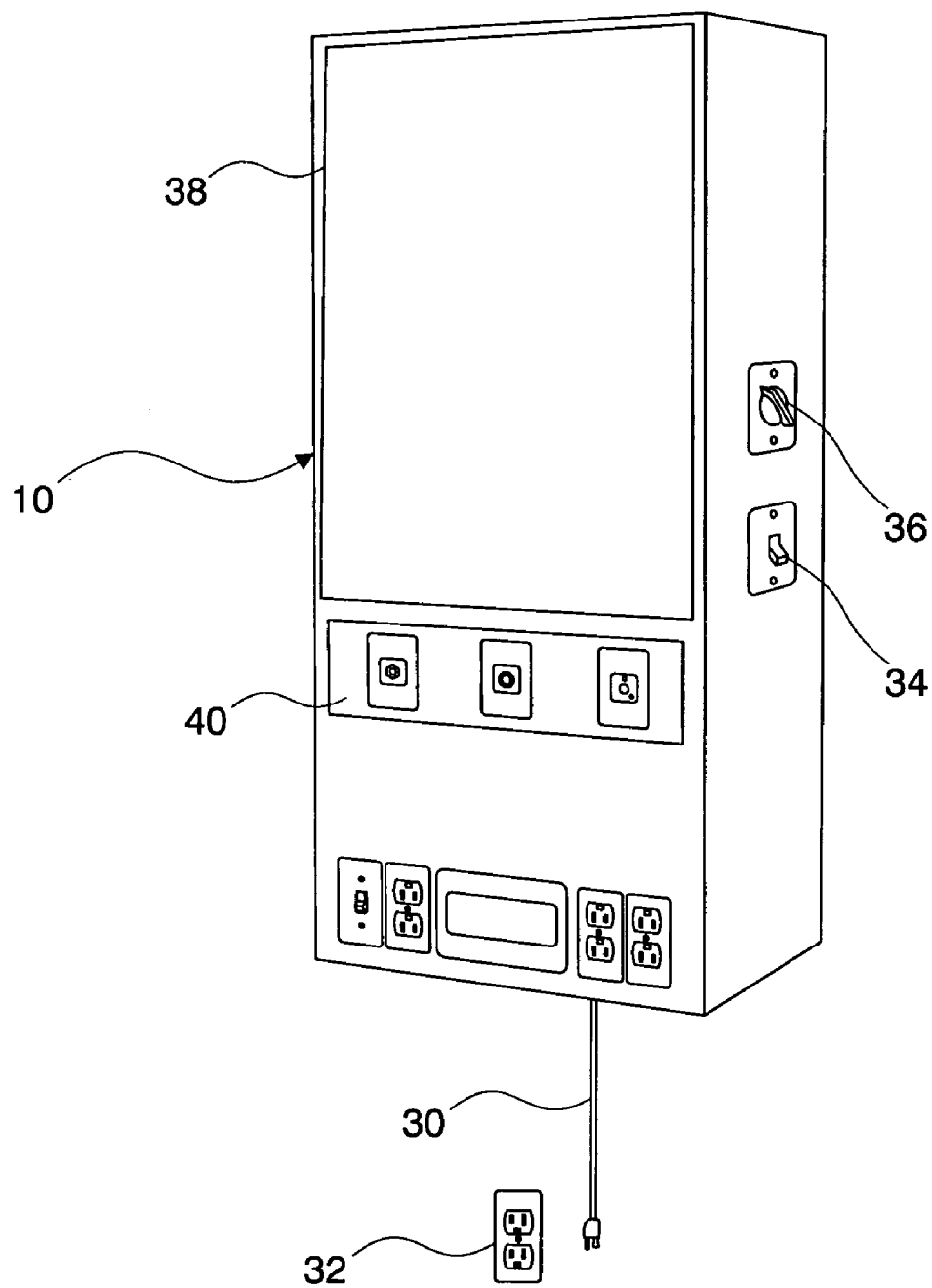
FIG. 3 is a perspective view of one embodiment of the invention.

In each configuration, the training headwall contains a cabinet 42 to which two motors are securely attached. At least one motor is a pump 14, and at least one motor is a compressor 12. The power of compressor 12 may be varied to correspond to the number of medical gas outlets attached. FIG. 1 shows two medical gas outlets, 16 and 18, while FIG. 3 shows three medical gas outlets, 16, 17 and 18, attached to compressor 12. However, any number of medical gas outlets may be attached to compressor 12, depending on the training needs and the power output of compressor 12.

The inventors currently prefer a compressor capable of delivering 50 psi, which allows multiple gas outlets 16, 17 and 18. Likewise, the power of vacuum pump 14 may vary depending on the number of vacuum medical gas outlets 20 connected to pump 14. The inventors currently prefer using a pump capable of providing 24 inches Hg maximum vacuum, which allows multiple vacuum outlets. Different pump and compressor capacities may be used as needed to increase or decrease the number of medical gas outlets in the training headwall. Additional motors may also be used, if desired by the training facility.

The motors 12 and 14 are attached to cabinet 42 of training headwall 10 in any convenient position, by any means capable of securely holding the motors in position. Air compressor 12 is connected to one or more medical gas outlets 16, 17 and 18 by piping or tubing 22 and 24 that provides an airtight connection between air compressor 12 and medical gas outlets 16, 17 and 18. Vacuum pump 14 is connected to one or more medical gas outlets 20 by piping or tubing 22 and 24 that provides an air-tight connection between pump 14 and medical gas outlets 20. The inventors currently prefer using brazed connections, but any method of providing a secure, air-tight connection between the motors, tubing and medical gas outlets may be used. There are many different types of tubing or pipes that can be used to connect compressor 12 to the medical gas outlets 16, 17 and 18. The connection may be made using flexible tubing only, rigid tubing only, or some combination of flexible and rigid tubing.

The inventors currently prefer, for spacing reasons, to connect compressor 12 to flexible tubing 22. Flexible tubing 22 is securely connected to rigid tube 24. As shown in FIG. 1, the relative locations of compressor 12 and rigid tube 24 are such that using only rigid pipes would require several joints, while using flexible tubing 22 allows for a joint-free connection between compressor 12 and rigid tube 24.

Figure 2:
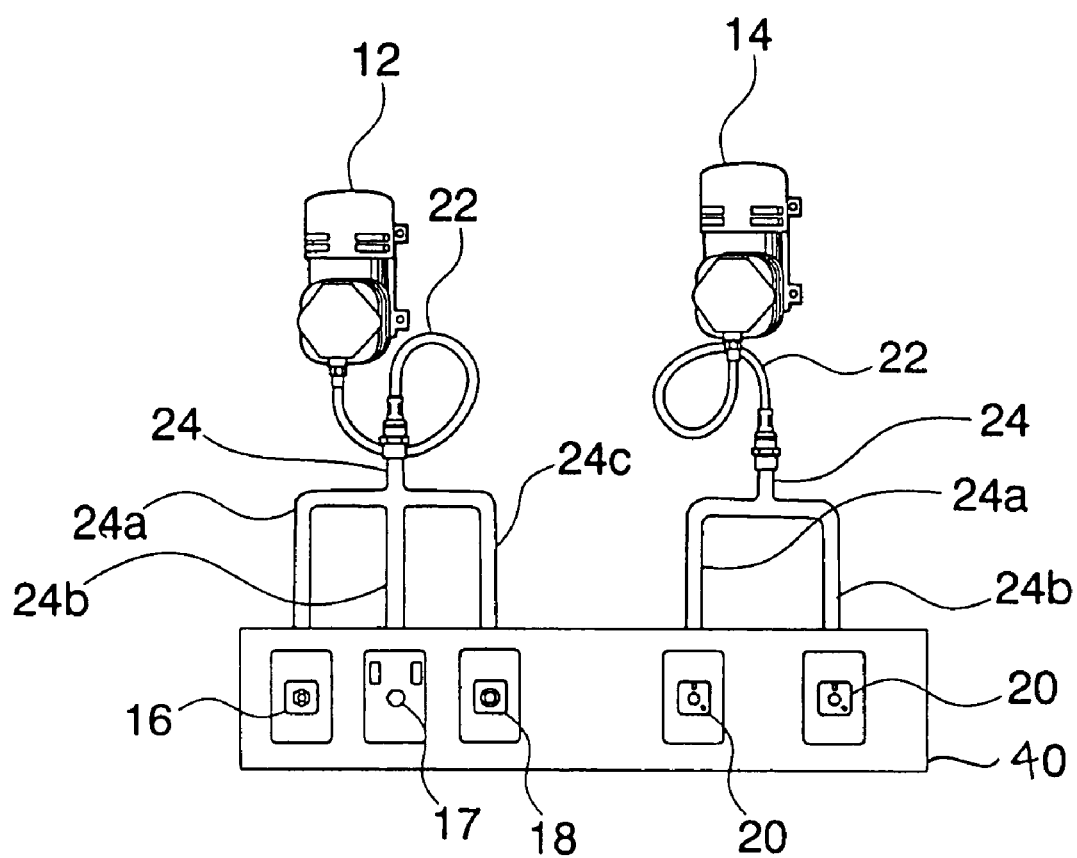
FIG. 2 is a front view of some of the internal components of the invention connected to an external console panel.

As shown in FIG. 1, rigid tube 24, through a T connection, splits into two rigid tubes, 24a and 24b. Tube 24a is securely connected to medical gas outlet 16 and tube 24b is securely connected to medical gas outlet 18. Medical gas outlets 16, 17 and 18 may be labeled "air", "oxygen", "nitrous oxide" or other gas, as desired. The type, number of, and labels for, the medical gas outlets may be varied, as requested by the training facility. For example, as shown in FIG. 2, tube 24 may be split into three tubes, 24a, 24b and 24c, each connected to the back side of a specific medical gas outlet 16, 17 and 18.

Similarly, vacuum pump 14 is connected via tubes or piping 22 and 24 in a secure and air-tight manner to the back side of one or more medical gas outlets 20, and may be connected using any combination of flexible and rigid tubing. Again, for spacing reasons, the inventors currently prefer to use flexible tubing 22 to connect to rigid pipe 24. Each of these medical gas outlets 20 may be identified as a "vacuum" outlet.

In the preferred embodiment, each medical gas outlet is located in a console panel 40 and has an external adaptation with a standard and specific external configuration to receive secondary medical equipment, such as a vacuum regulator or flow meter. As shown in FIG. 2, the front side of medical gas outlet 16 has an external adaptation in a standard configuration that is adapted to receive secondary medical equipment that supplies oxygen to a patient; the front side of medical gas outlet 17 has an external adaptation in a standard configuration that is adapted to receive secondary medical equipment that supplies nitrous oxide to a patient; the front side medical gas outlet 18 has an external adaptation in a standard configuration that is adapted to receive secondary medical equipment that supplies medical air to a patient; and the front side of medical gas outlet 20 has an external adaptation in a standard configuration that is adapted to receive secondary medical equipment that supplies vacuum to the patient.

Typically, a vacuum regulator is attached to the "vacuum" outlet, and a flow meter is attached to the other medical gas outlets. Both the regulator and flow meter have a mechanism, typically a knob, for adjusting the vacuum or air flow rate. One or more students may use the training headwall to practice and learn patient care. The student may use the training headwall to practice attaching the appropriate flow meter or vacuum regulator to the medical gas outlet. The student may then practice adjusting the air or vacuum flow by adjusting the respective knobs to deliver the appropriate level of air or vacuum.

The medical gas outlets 16, 17, 18 and 20 may be labeled to correspond to the standard configuration of the external adaptation. The type and quantity of medical gas outlets may be varied in any manner, for example there may be a single "air" "nitrous oxide" "oxygen" and "vacuum" medical gas outlet, or there may be two "oxygen" medical gas outlets and one "air" outlet, or any other combination to simulate the flow of gas.

Each medical gas outlets acts as a valve, and only allows the compressed air or vacuum to exit when a piece of secondary medical equipment is attached to the standard external adaptation. For example, when the compressor is running, the compressed air will flow through the air-tight tubing to the medical gas outlets. Air will not exit the external adaptation unless secondary medical equipment is attached. Thus, if secondary medical equipment is attached only to the "oxygen" outlet, compressed air will only flow through that outlet, and no other. Likewise, when the vacuum pump is running, a vacuum will be pulled though the medical gas outlet only if secondary equipment is attached.

In headwalls used on actual patients the diameter of the gas and vacuum tubing is a set medical standard. These standards are not required for training headwall 10, and any diameter tubing that is capable of delivering the compressed air, or vacuum to the medical gas outlets may be used. The inventors currently prefer to use ½ inch diameter flexible and rigid tubing, although any size tubing that allows the air or vacuum to be delivered to the medical gas outlets may be used. The flexible and rigid tubing connects compressor 12 and pump 14 to the respective medical gas outlets 16.

As shown in FIGS. 1 and 3, the motors are powered by electricity supplied through electrical wires 26 that are connected to electrical cord 30 which may be plugged into a normal wall electrical outlet 32. The motors may be activated by an electrical switch 34 on the outside of training headwall 10. The inventors currently prefer to use a switch with a timer 36. The use of timer 36 is preferred, but not necessary, because timer 36 reduces the chance of motor burnout if the motor is inadvertently left running for extended lengths of time. However, any type of electrical switch may be used, either with or without a timer, to turn the motors on and off.

As shown in FIG. 3, the headwall typically contains removable front panel 38 that covers the motors, electrical cords, air-tight tubing and other internal equipment. The removable front panel 38 is not necessary to the invention and is provided for aesthetic reasons.

The entire headwall is a self-contained unit. Although the training headwalls are typically fixed to the walls of the training facility, the training headwalls may be placed or attached to a cart or other device that allows the training headwall to be moved from location to location.

Although specific embodiments of the present invention have been illustrated in the accompanying drawings and described in the description of the invention, it will be understood that the invention is not limited to the particular embodiments described herein, but is capable of numerous rearrangements, modifications and substitutions without departing from the scope of the invention.

We claim:

1. A training headwall comprising:

A self-contained unit with at least two motors securely attached to a cabinet, wherein at least one motor is a compressor capable of producing compressed air and at least one motor is a vacuum pump capable of producing a vacuum, a first length of air-tight tubing connecting said compressor with at least two medical gas outlets with external adaptations configured to receive secondary medical equipment, wherein said compressor is connected by said air-tight tubing to an "oxygen" labeled medical gas outlet, and is capable of delivering compressed air to secondary medical equipment that delivers oxygen, and wherein a flow meter adjusts said compressed air flow through said oxygen-labeled gas outlet, and wherein said compressor is connected by said air-tight tubing to an "air" labeled medical gas outlet, and is capable of delivering compressed air to secondary medical equipment that delivers air, and wherein a flow meter adjusts said compressed air flow, a second length of air-tight tubing connecting said vacuum pump with at least one "vacuum" labeled medical gas outlet with external adaptations configured to receive secondary medical equipment, wherein said vacuum pump capable of delivering vacuum to secondary medical equipment, and wherein a vacuum regulator adjusts said vacuum flow.

2. The training headwall of claim 1 wherein the headwall is permanently mounted on a wall.

3. The training headwall of claim 1 wherein the headwall is mobile.

4. The training headwall of claim 1 wherein the motors are activated by an electrical switch.

5. The training headwall of claim 4 with a timer to limit the length of time that electricity is supplied to the motors.

6. The training headwall of claim 1 wherein the air-tight tubing is rigid tubing.

7. The training headwall of claim 1 wherein the air-tight tubing is flexible tubing.

8. The training headwall of claim 1 wherein the air-tight tubing is a combination of rigid and flexible tubing.

9. The training headwall of claim 1 wherein each gas outlet is located in a console panel.

10. The training headwall of claim 1 wherein said first length of air-tight tubing connects said compressor with at least one additional medical gas outlet, wherein each additional outlet comprises an external adaptation configured to receive secondary medical equipment, and wherein at least one of said medical gas outlets is labeled "nitrous oxide" and is capable of delivering compressed air to secondary medical equipment that delivers nitrous oxide, and wherein a flow meter adjusts said compressed air flow.

11. The training headwall of claim 10 wherein said flow meter has a knob for adjusting said air flow.

12. The training headwall of claim 1 wherein each of said gas outlets delivers compressed air to secondary medical equipment, and is identified with a label selected from the group consisting of oxygen, nitrous oxide, and medical air.

13. The training headwall of claim 1 wherein the cabinet and motors are concealed by a removable front panel.

14. The training headwall of claim 1 wherein a student learns patient care procedures by attaching said flow meter to said gas outlet, and adjusting said flow meter to regulate the flow of compressed air.

15. The training headwall of claim 1 wherein a student learns patient care procedures by attaching said vacuum regulator to said vacuum gas outlet, and adjusting said vacuum regulator to regulate said vacuum flow.

16. A method to practice patient care using a patient care training headwall, comprising:
   (a) use, by one or more students, of a self-contained patient care training headwall to practice patient care, wherein said self-contained training headwall comprises:
   at least two motors securely attached to a cabinet,
   wherein at least one motor is a compressor capable of producing compressed air, wherein said compressed air flows from said motor to at least two labeled gas outlets,
   wherein a first of said at least two labeled gas outlets is labeled "oxygen" and is connected with an external adaptation configured to receive secondary equipment capable of delivering oxygen, connected with a flow meter,
   wherein a second of said at least two labeled gas outlets is labeled "air" and is connected with an external adaptation configured to receive secondary equipment capable of delivering medical air, connected with a flow meter,
   wherein at least one motor is a vacuum pump capable of producing a vacuum wherein said vacuum flows from said pump to at least one "vacuum" labeled gas outlet, and wherein said gas outlet is connected with an external adaptation configured to receive secondary medical equipment capable of delivering vacuum, connected with a vacuum regulator;
   (b) practicing attaching secondary medical equipment capable of supplying oxygen to said labeled oxygen gas outlet,
   (c) practicing adjusting said flow meter connected with said oxygen gas outlet to adjust the flow of compressed air through said oxygen gas outlet;
   (d) practicing attaching secondary medical equipment capable of supplying medical air to said labeled air outlet;
   (e) practicing adjusting said flow meter connected with said air gas outlet to adjust the flow of compressed air;
   (f) practicing attaching secondary medical equipment capable of delivering vacuum to said labeled vacuum outlet,
   (e) practicing adjusting said vacuum regulator connected with said vacuum gas outlet to adjust the flow of vacuum.

17. The method of claim 16, wherein the air compressor is connected to a third "nitrous oxide" labeled gas outlet which is connected with an external adaptation configured to receive secondary equipment capable of delivering nitrous oxide, connected with a flow meter, and with additional steps:
   (g) practicing attaching secondary medical equipment capable of supplying nitrous oxide to said labeled nitrous oxide gas outlet;
   (h) practicing adjusting said flow meter connected with said nitrous oxide gas outlet to adjust the flow of air.

* * * * *